US012616169B2

(12) United States Patent
Biffert et al.

(10) Patent No.: US 12,616,169 B2
(45) Date of Patent: May 5, 2026

(54) LIVESTOCK EAR TAG SYSTEM

(71) Applicant: 701x Inc., Fargo, ND (US)

(72) Inventors: Kevin N. Biffert, Horace, ND (US); Maximillion K. Cossette, Fargo, ND (US); Steven J. Berlinger, Dilworth, MN (US); Peter S. Crowley, Fargo, ND (US); Cole L. Mehring, Fargo, ND (US); Keith D. Alsleben, Fargo, ND (US); Braydon W. Love, Fergus Falls, MN (US)

(73) Assignee: 701x Inc., Fargo, ND (US)

( * ) Notice: Subject to any disclaimer, the term of this patent is extended or adjusted under 35 U.S.C. 154(b) by 202 days.

(21) Appl. No.: 18/392,037

(22) Filed: Dec. 21, 2023

(65) Prior Publication Data

US 2025/0204488 A1    Jun. 26, 2025

(51) Int. Cl.
*A01K 11/00*        (2006.01)

(52) U.S. Cl.
CPC .......... *A01K 11/004* (2013.01); *A01K 11/001* (2013.01)

(58) Field of Classification Search
CPC ............................ A01K 11/001; A01K 11/004
USPC ........................................................ 40/301
See application file for complete search history.

(56) References Cited

U.S. PATENT DOCUMENTS

| 4,461,241 A | 7/1984 | Ostler |
| 4,503,808 A | 3/1985 | McAlister |

| 4,512,096 A | 4/1985 | Heidecker |
| 5,711,246 A | 1/1998 | Yano |
| 5,791,294 A | 8/1998 | Manning |
| 5,794,569 A | 8/1998 | Titus |
| 5,857,433 A | 1/1999 | Files |
| 6,067,018 A | 5/2000 | Skelton |
| 6,111,508 A | 8/2000 | Ensor |
| 6,243,039 B1 | 6/2001 | Elliot |
| 6,375,612 B1 | 4/2002 | Guichon |
| 6,507,771 B2 | 1/2003 | Payton |
| 6,510,380 B1 | 1/2003 | Curatolo |
| 6,512,478 B1 | 1/2003 | Chien |
| 6,674,368 B2 | 1/2004 | Hawkins |
| 6,720,879 B2 | 4/2004 | Edwards |

(Continued)

FOREIGN PATENT DOCUMENTS

| AU | 2017239570 A1 | 4/2018 |
| AU | 2021102218 A4 | 6/2021 |

(Continued)

OTHER PUBLICATIONS https://www.gammon.com.au/power; "Power Saving Techniques for Microprocessors" Gammon Forum Webpage; Jan. 13, 2012.

(Continued)

*Primary Examiner* — Kyle R Grabowski
(74) *Attorney, Agent, or Firm* — Neustel Law Offices

(57)        ABSTRACT

A livestock ear tag system is disclosed herein. An example tag includes a flexible substrate having a first end and a second end, a solar panel coupled to the first end on a first surface, a rigid housing associated with the second end, an electronics assembly associated with the rigid housing, a sensor housing that extends from the rigid plate, the sensor housing comprising two pin receivers that extend in opposing directions relative to one another, the two pin receivers each adapted to receive a pin that secures the device to an ear of an animal.

18 Claims, 7 Drawing Sheets

(56) References Cited

U.S. PATENT DOCUMENTS

| | | | |
|---|---|---|---|
| 6,788,199 B2 | 9/2004 | Crabtree | |
| 6,805,078 B2 | 10/2004 | Zimmerman | |
| 6,868,804 B1 | 3/2005 | Huisma | |
| 6,997,140 B2 | 2/2006 | Finlayson | |
| 6,998,980 B2 | 2/2006 | Ingley, III | |
| 6,998,985 B2 | 2/2006 | Reisman | |
| 7,059,275 B2 | 6/2006 | Laitinen | |
| 7,164,986 B2 | 1/2007 | Humphries | |
| 7,218,229 B2 | 5/2007 | Boyd | |
| 7,234,421 B2 | 6/2007 | Natividade | |
| 7,248,167 B2 | 7/2007 | Wassingbo | |
| 7,335,168 B2 | 2/2008 | Rugg | |
| 7,411,492 B2 | 8/2008 | Greenberg | |
| 7,467,603 B2 | 12/2008 | Davies | |
| 7,525,425 B2 | 4/2009 | Diem | |
| 7,616,124 B2 | 11/2009 | Paessel | |
| 7,728,724 B1 | 6/2010 | Scalisi | |
| 7,830,257 B2 | 11/2010 | Hassell | |
| 7,904,244 B2 | 3/2011 | Sugla | |
| 7,918,185 B2 | 4/2011 | Araki | |
| 8,018,329 B2 | 9/2011 | Morgan | |
| 8,125,332 B2 | 2/2012 | Curran | |
| 8,149,125 B2 | 4/2012 | Geissler | |
| 8,285,245 B2 | 10/2012 | Ashley, Jr. | |
| 8,312,845 B2 | 11/2012 | Guinta | |
| 8,340,022 B2 | 12/2012 | Lee | |
| 8,849,926 B2 | 9/2014 | Marzencki | |
| 8,890,677 B2 | 11/2014 | Raphaeli | |
| 8,979,757 B2 | 3/2015 | Mottram | |
| 8,983,426 B2 | 3/2015 | Cermak | |
| 9,038,293 B2 | 5/2015 | Decaluwe | |
| 9,044,297 B2 | 6/2015 | Rajkondawar | |
| 9,370,170 B2 | 6/2016 | Downing | |
| 9,448,072 B2 | 9/2016 | Bandyopadhyay | |
| 9,449,202 B2 | 9/2016 | Clare | |
| 9,489,813 B1 | 11/2016 | Beigel | |
| 9,504,387 B2 | 11/2016 | Lanza | |
| 9,848,577 B1 | 12/2017 | Brandao | |
| 9,936,676 B1 | 4/2018 | Ulmer | |
| 9,980,467 B2 | 5/2018 | Auer | |
| 10,075,813 B1 | 9/2018 | Struhsaker | |
| 10,242,547 B1 | 3/2019 | Struhsaker | |
| 10,292,370 B2 | 5/2019 | Mobley | |
| 10,660,546 B2 | 5/2020 | Saigh | |
| 10,697,947 B1 | 6/2020 | Armitage | |
| 11,232,393 B1 | 1/2022 | Kim | |
| 11,324,197 B2 | 5/2022 | Smith | |
| 11,503,802 B2 | 11/2022 | Jones | |
| D990,792 S | 6/2023 | Smith | |
| 12,029,197 B1 | 7/2024 | Biffert | |
| 2002/0046713 A1 | 4/2002 | Otto | |
| 2002/0050248 A1 | 5/2002 | Pratt | |
| 2004/0074448 A1 | 4/2004 | Bunt | |
| 2004/0078390 A1 | 4/2004 | Saunders | |
| 2005/0006153 A1 | 1/2005 | Baarsch | |
| 2005/0162279 A1 | 7/2005 | Marshall | |
| 2006/0097882 A1 | 5/2006 | Brinkerhoff | |
| 2006/0161443 A1 | 7/2006 | Rollins | |
| 2006/0201432 A1 | 9/2006 | Pratt | |
| 2006/0267731 A1 | 11/2006 | Chen | |
| 2007/0012260 A1 | 1/2007 | Boyd | |
| 2007/0171048 A1 | 7/2007 | Shapiro | |
| 2007/0209594 A1 | 9/2007 | Kaever | |
| 2007/0229350 A1 | 10/2007 | Scalisi | |
| 2008/0147458 A1 | 6/2008 | Yamazaki | |
| 2009/0309736 A1* | 12/2009 | Heurtier | G08B 13/2434 |
| | | | 340/10.1 |
| 2010/0030036 A1 | 2/2010 | Mottram | |
| 2010/0127853 A1 | 5/2010 | Hanson | |
| 2010/0156606 A1 | 6/2010 | Gold | |
| 2011/0102154 A1 | 5/2011 | Hindhede | |
| 2011/0125062 A1 | 5/2011 | Mulder | |
| 2011/0125065 A1 | 5/2011 | Voronin | |
| 2011/0148639 A1 | 6/2011 | Geissler | |
| 2011/0192356 A1 | 8/2011 | Loosveld | |

| | | | |
|---|---|---|---|
| 2012/0050046 A1 | 3/2012 | Satorius | |
| 2012/0065483 A1 | 3/2012 | Chung | |
| 2012/0294876 A1 | 11/2012 | Zimmerman | |
| 2013/0175347 A1 | 7/2013 | Decaluwe | |
| 2013/0340305 A1 | 12/2013 | Mobley | |
| 2014/0237595 A1 | 8/2014 | Sridhara | |
| 2015/0039239 A1 | 2/2015 | Shuler | |
| 2015/0097668 A1 | 4/2015 | Toth | |
| 2015/0282457 A1 | 10/2015 | Yarden | |
| 2015/0373951 A1 | 12/2015 | Kelly | |
| 2016/0143719 A1 | 5/2016 | Folkers | |
| 2017/0156288 A1 | 6/2017 | Singh | |
| 2017/0196203 A1 | 7/2017 | Huisma | |
| 2018/0048987 A1 | 2/2018 | Morris | |
| 2018/0054399 A1 | 2/2018 | Shinoda | |
| 2018/0146645 A1 | 5/2018 | Arbel | |
| 2018/0160649 A1 | 6/2018 | Hicks | |
| 2018/0279582 A1 | 10/2018 | Yajima | |
| 2018/0295809 A1 | 10/2018 | Yajima | |
| 2018/0374165 A1 | 12/2018 | Ferro dos Santos | |
| 2019/0008117 A1 | 1/2019 | Dijkstra | |
| 2019/0008124 A1 | 1/2019 | Komatsu | |
| 2019/0141959 A1 | 5/2019 | Ingham | |
| 2019/0220844 A1 | 7/2019 | Trivelpiece | |
| 2019/0223408 A1 | 7/2019 | Brayer | |
| 2019/0254601 A1 | 8/2019 | Blackmore | |
| 2019/0380311 A1 | 12/2019 | Crouthamel | |
| 2020/0022338 A1 | 1/2020 | Rovnyi | |
| 2020/0029534 A1 | 1/2020 | Austin | |
| 2020/0085005 A1 | 3/2020 | Yoo | |
| 2020/0107522 A1 | 4/2020 | Kersey | |
| 2020/0125849 A1 | 4/2020 | Labrecque | |
| 2020/0159720 A1 | 5/2020 | Leong | |
| 2020/0160009 A1 | 5/2020 | Vatn | |
| 2020/0323170 A1 | 10/2020 | Garigan | |
| 2020/0359605 A1 | 11/2020 | Maher | |
| 2020/0367471 A1 | 11/2020 | Deliou | |
| 2021/0022615 A1* | 1/2021 | Greer | G08B 21/182 |
| 2021/0148881 A1 | 5/2021 | Deng | |
| 2021/0185979 A1* | 6/2021 | Jones | A01K 11/004 |
| 2022/0104929 A1 | 4/2022 | Cummins | |
| 2022/0192150 A1 | 6/2022 | Biffert | |
| 2022/0192151 A1 | 6/2022 | Biffert | |
| 2022/0192152 A1 | 6/2022 | Biffert | |
| 2022/0200519 A1 | 6/2022 | Biffert | |
| 2022/0386564 A1 | 12/2022 | Smith | |

FOREIGN PATENT DOCUMENTS

| | | | | |
|---|---|---|---|---|
| CN | 101221231 A | | 7/2008 | |
| CN | 118765814 A | * | 10/2024 | A01K 29/005 |
| EP | 3153095 A1 | | 4/2017 | |
| EP | 3188648 B1 | | 1/2020 | |
| FR | 2801491 A1 | | 6/2001 | |
| GB | 2387465 A | | 10/2003 | |
| WO | 2000011939 A2 | | 3/2000 | |
| WO | WO-2004036984 A1 | * | 5/2004 | A01K 11/004 |
| WO | 2005034617 A1 | | 4/2005 | |
| WO | WO-2011019262 A2 | * | 2/2011 | A01K 11/001 |
| WO | WO-2019040721 A2 | * | 2/2019 | A01K 11/008 |
| WO | WO-2019218012 A1 | * | 11/2019 | A01K 11/004 |
| WO | 2019241831 A1 | | 12/2019 | |
| WO | 2019245978 A1 | | 12/2019 | |
| WO | 2020031050 A1 | | 2/2020 | |
| WO | 2020120516 A1 | | 6/2020 | |
| WO | 2021000016 A1 | | 7/2021 | |
| WO | 2021203166 A1 | | 10/2021 | |
| WO | 2021255731 A1 | | 12/2021 | |
| WO | 2022005288 A1 | | 1/2022 | |
| WO | 2022145792 A1 | | 7/2022 | |
| WO | 2022178572 A1 | | 9/2022 | |
| WO | 2022226596 A1 | | 11/2022 | |
| WO | 2023159272 A1 | | 8/2023 | |

OTHER PUBLICATIONS

Notice of Allowance Document Received for U.S. Appl. No. 18/162,885; Received May 8, 2024.

(56) References Cited

OTHER PUBLICATIONS

PCT International Search Report and Written Opinion for PCT/US2023/086390; Apr. 19, 2024.

Atmel 8-Bit AVR Microcontroller with 2/4/8K Byes In-System Programmable Flash Datasheet; 2013. (Year: 2013).

Non-Final Office Action Document Received for U.S. Appl. No. 17/557,559; Received Dec. 22, 2023.

Non-Final Office Action Document Received for U.S. Appl. No. 18/302,351; Received Oct. 22, 2024.

PCT International Search Report and Written Opinion for PCT/US2023/086378; Apr. 11, 2024.

Non-Final Office Action Document Received for U.S. Appl. No. 18/330,659; Received Oct. 10, 2024.

EPO Search Report and Opinion for Publication No. EP4266876; Oct. 8, 2024.

PCT Search Report and Opinion for PCT/US2024/029580; Sep. 17, 2024.

https://cerestag.com/products/ceres-trace-pfi; Ceres Tag Webpage "Ceres Trace Pasture Feed Intake" and Screenshots Therof; Nov. 3, 2023.

http://www.precisionanimalsolutions.com/how-it-works-.html; Precision Animal Solutions REDI Website; Mar. 14, 2023.

http://www.sensehubbeef.com/; Allflex Livestock Intelligence "SenseHub Beef" Webpage; Received Sep. 3, 2020.

http://www.sensehubbeef.com/documents/pdf/SenseHubBeef.pdf; Allflex Livestock Intelligence "SenseHub Beef" Cow Monitoring Brochure; Copyright 2018.

https://www.cerestag.com/; Ceres Tag Website; Received Sep. 3, 2020.

https://web.archive.org/web/20200806065228/https://www.cerestag.com/benefits/; Internet Archive Wayback Machine Archive.org "Ceres Tag Benefits" Webpage; Aug. 6, 2020.

https://www.moovement.com.au/gps-ear-tags; mOOvement "GPS Ear Tag" Website; Received Sep. 3, 2020.

https://ieeexplore.ieee.org/document/1280774; IEEE Xplore Webpage Article "Wearable Sensor System for Wireless State-of-Health Determination in Cattle"; L. Nagl; Sep. 17, 2003.

https://www.mdpi.com/1424-8220/9/5/3586/htm; MDPI Webpage Article "Monitoring Animal Behaviour and Environmental Interactions Using Wireless Sensor Networks, GPS Collars and Satellite Remote Sensing"; Rebecca N. Handcock; Published May 13, 2009.

https://www.mdpi.com/1424-8220/9/5/3942/pdf; MDPI.com Webpage Article "A Heterogeneous Wireless Identification Network for the Localization of Animals based on Stochastic Movements"; Alvaro Gutierrez; May 25, 2009.

http://www.diva-portal.org/smash/get/diva2:21508/FULLTEXT01.pdf; Diva Article "Sensor Systems for Positioning and Identification in Ubiquitous Computing"; Suri Jayabharath Kumar; Feb. 13, 2006.

https:/www.beefcentral.com/ag-tech/gps-enabled-livestock-monitoring-tags-reach-the-commercial-market/; GPS-enabled livestock monitoring tags reach the commercial market; Beef Central; Mar. 17, 2020.

https://journalajarr.com/index.php/AJARR/article/view/13035/23855; "Design and Implementation of a Cattle Grazing Tracking and Anti-theft Alert GPS/GSM Collar, Leveraging on Improvement in Telecom and ICT Infrastructure", Asian Journal of Advanced Research and Reports, May 25, 2018.

PCT International Search Report and Opinion for PCT/US2021/064611; Apr. 27, 2022.

Non-Final Office Action Document Received for U.S. Appl. No. 18/303,730; Received Jan. 3, 2025.

* cited by examiner

LIVESTOCK EAR TAG SYSTEM

CROSS-REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

The described example embodiments in general relate to a tag, and more specifically, but not by way of limitation, to a tag that can be applied to an animal to track motion and infer behaviors. Embodiments of the tag are structurally configured with a dual pin configuration to ensure the tag and reduce rotation of the same.

SUMMARY

According to some embodiments, the present disclosure is directed to a tag or device. The device includes a flexible substrate having a first end and a second end; a solar panel coupled to the first end on a first surface; a rigid housing associated with the second end; an electronics assembly associated with the rigid housing; and a sensor housing that extends from the rigid housing, the sensor housing may include two pin receivers that extend in opposing directions relative to one another, the two pin receivers each adapted to receive a pin that secures the device to an ear of an animal. Other embodiments of this aspect include corresponding computer systems, apparatus, and computer programs recorded on one or more computer storage devices, each configured to perform the actions of the methods.

Implementations may include one or more of the following features. The device may include an antenna coupled to the electronics assembly. The device may include a skin contact sensor associated with the sensor housing. The device may include a stiffening spine that extends perpendicularly from the flexible substrate, the stiffening spine also extending along a midline of the device. The stiffening spine includes a continuous portion and a sawtooth portion, where the sawtooth portion enables controlled bending of the flexible substrate. The device may include another stiffening spine constructed identically to the stiffening spine and placed in a parallel relationship thereto. The two-pin receivers are spaced apart from the rigid housing at a distance. Implementations of the described techniques may include hardware, a method or process, or computer software on a computer-accessible medium.

One general aspect includes an electronic tag. The electronic tag also includes a first segment with a photovoltaic element affixed on a primary side thereof. The tag also includes a second segment, opposite the first segment, integrating a supportive backplate. The tag also includes an electronics assembly mounted on the supportive backplate, encompassing control circuitry. The tag also includes a coupling feature extending from the supportive backplate having dual engagement cavities oriented in opposite vectors, each configured to accommodate a securing element for affixation to the ear of an animal. Other embodiments of this aspect include corresponding computer systems, apparatus, and computer programs recorded on one or more computer storage devices, each configured to perform the actions of the methods.

Implementations may include one or more of the following features. The electronic tag further includes an antenna operatively connected to the electronics assembly. The antenna is a multi-directional signal transmitter. The electronic tag may include an external sensor, the electronics assembly communicatively coupled to the external sensor over a wireless connection. The electronic tag further including an elongated reinforcement rail that traverses orthogonally across the first and second segments, situated centrally along a longitudinal axis of the electronic tag. The elongated reinforcement rail is bifurcated into a solid section and an adjustable serrated section, the latter facilitating predefined articulation of the first segment. The elongated reinforcement rail is duplicated and arranged in a parallel configuration for reinforced structural integrity. The electronic tag may include a heart rate sensor. The electronics assembly further integrates a storage cell electrically coupled to the photovoltaic element for energy accumulation and dispensation. The photovoltaic element is configured to extend past a periphery of the ear with the tag installed. The second segment includes a portion that receives indicia for identifying the animal. The first segment is a flexible substrate. Implementations of the described techniques may include hardware, a method or process, or computer software on a computer-accessible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

Figure 1:
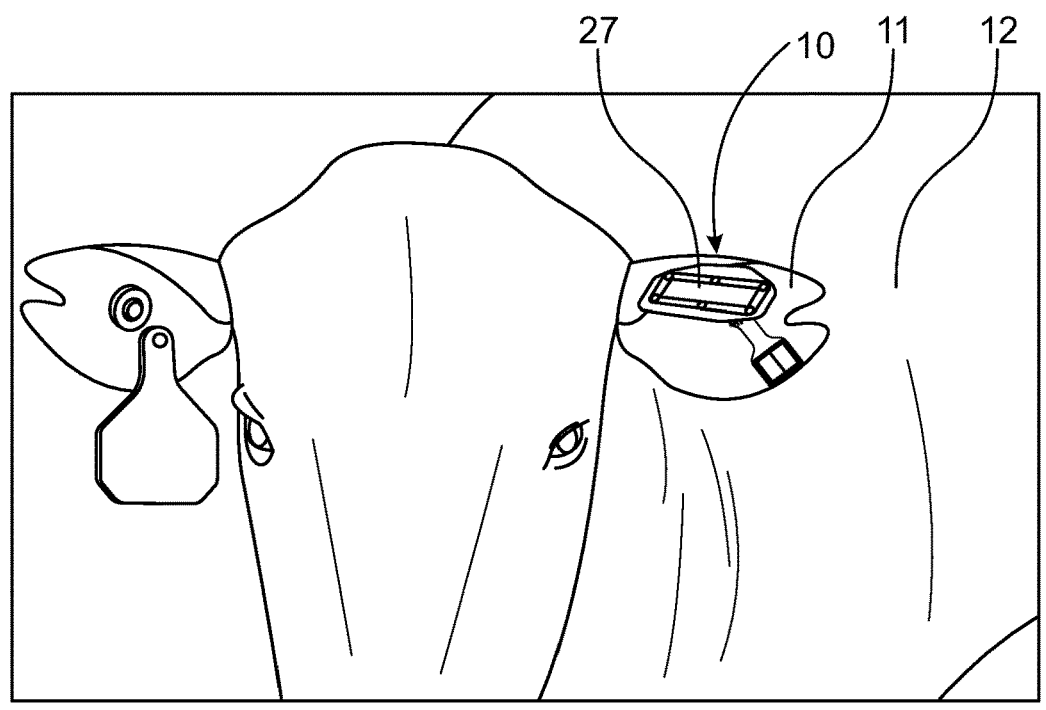
FIG. 1 is a front perspective view of a foldable ear tag in accordance with an example embodiment in association with an animal.

U.S. Patent Publication No. US-2022-0192152-A1, the entire disclosure of which, except for any definitions, disclaimers, disavowals, and inconsistencies, is incorporated herein by reference. The tag disclosed here can include any of the electronic components disclosed in US-2022-0192152-A1.

A. Overview

The present disclosure is directed to an electronic tag devised for attachment to an animal's ear, offering an array of functionalities that extend from identification to comprehensive health monitoring. The design merges a flexible substrate, which ensures a comfortable fit on the animal's ear, with a solar panel for energy sustainability, and a rigid housing, where the electronics are securely housed, as well as a dual pin securement means. One example includes a sensor housing—protruding from the rigid base—that houses two pin receivers, alternatively termed fastening apertures, which enable a secure and dependable fixation of the tag to the animal, ensuring stability across various environmental conditions.

These receivers are positioned in opposing directions, a feature that significantly enhances the device's resistance to rotational forces when affixed to an animal's ear. The use of dual pins for securing the device not only provides a robust attachment but also maintains the orientation of the tag, ensuring consistent performance and reliability of the integrated sensors and electronic components. The structure of the tag ensures secure and stable installation, which is crucial for the tag's functionality in dynamic environments that the animals may encounter.

The tag integrates one or more antennas communicatively coupled with the electronics assembly. The antenna, which can also be described as a signal transceiver component, enhances the device's function by enabling the transmission and reception of data, an essential capability for activities such as livestock management and wildlife monitoring.

The tag includes a skin contact sensor within the sensor housing, or what could also be termed the animal contact interface. This sensor's potential to collect vital health metrics underscores the tag's role not just in identification but also in the proactive health management of the animal.

An additional structural feature is the stiffening spine that runs perpendicularly from the flexible substrate. This component, also known as an elongated reinforcement rail, adds the needed rigidity to the device, assisting in preserving the tag's configuration against the dynamic activities of the animal. In some instances, the stiffening spine is comprised of both a continuous portion and a sawtooth portion—the latter being referred to as a flexure-facilitating section. This sawtooth design grants the tag controlled flexibility, allowing it to maintain a secure yet non-restrictive fit on the animal's ear. A second stiffening spine, constructed identically to the first and situated in parallel. This replication of the stiffening spine, or the dual elongated reinforcement rails, augments the tag's structural resilience, thus fortifying its durability and ensuring its longevity even under strenuous conditions.

B. Exemplary Telecommunications Networks

Some of the embodiments of the present disclosure may be utilized upon any telecommunications network capable of transmitting data including voice data and other types of electronic data. Examples of suitable telecommunications networks for some of the embodiments of the present disclosure include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). Some of the example embodiments of the present disclosure may communicate via a single telecommunications network or multiple telecommunications networks concurrently. Various protocols may be utilized by the electronic devices for communications such as but not limited to HTTP, SMTP, FTP and WAP (Wireless Application Protocol). Some of the embodiments of the present disclosure may be implemented upon various wireless networks such as but not limited to 3G, 4G, 5G, LTE, CDPD, CDMA, GSM, PDC, PHS, TDMA, FLEX, REFLEX, IDEN, TETRA, DECT, DATATAC, and MOBITEX. Some of the various example embodiments of the present disclosure may also be utilized with online services and internet service providers.

The Internet is an exemplary telecommunications network for the embodiments of the present disclosure. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

C. Central Communication Unit

The central communication unit may be comprised of any central communication site where communications are preferably established with. The central communication units may be comprised of a server computer, cloud-based computer, virtual computer, home computer or other computer system capable of receiving and transmitting data via IP networks and the telecommunication networks. As can be appreciated, a modem or other communication device may be required between each of the central communication units and the corresponding telecommunication networks. The central communication unit may be comprised of any electronic system capable of receiving and transmitting information (e.g. voice data, computer data, etc.).

D. Mobile Device

The mobile device may be comprised of any type of computer for practicing the various aspects of the embodiments of the present disclosure. For example, the mobile device can be a personal computer (e.g. APPLE® based computer, an IBM based computer, or compatible thereof) or tablet computer (e.g. IPAD®). The mobile device may also be comprised of various other electronic devices capable of sending and receiving electronic data including but not limited to smartphones, mobile phones, telephones, personal digital assistants (PDAs), mobile electronic devices, hand-held wireless devices, two-way radios, smart phones, communicators, video viewing units, television units, television receivers, cable television receivers, pagers, communication devices, and digital satellite receiver units.

The mobile device may be comprised of any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the embodiments of the present disclosure. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor, together with an operating system, operates to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

E. Main Component

Figure 2:
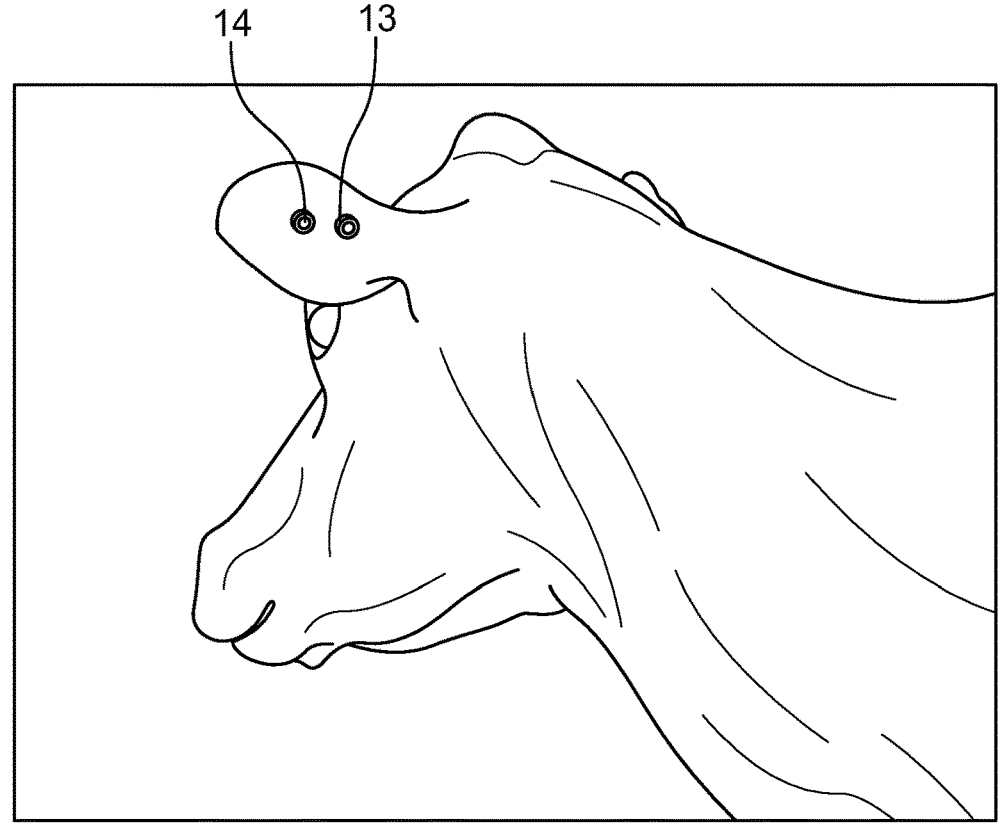
FIG. 2 is a rear perspective view of a foldable ear tag in accordance with an example embodiment in association with an animal.

FIG. 1 is a front perspective view of an example tag 10 that is configured to be installed on an ear 11 of an animal 12. FIG. 2 is a rear perspective view of the tag 10 that is configured to be installed on the ear 11 of the animal 12, showing two fasteners 13 and 14 that are used to join the tag 10 to the ear 11.

Figure 3:
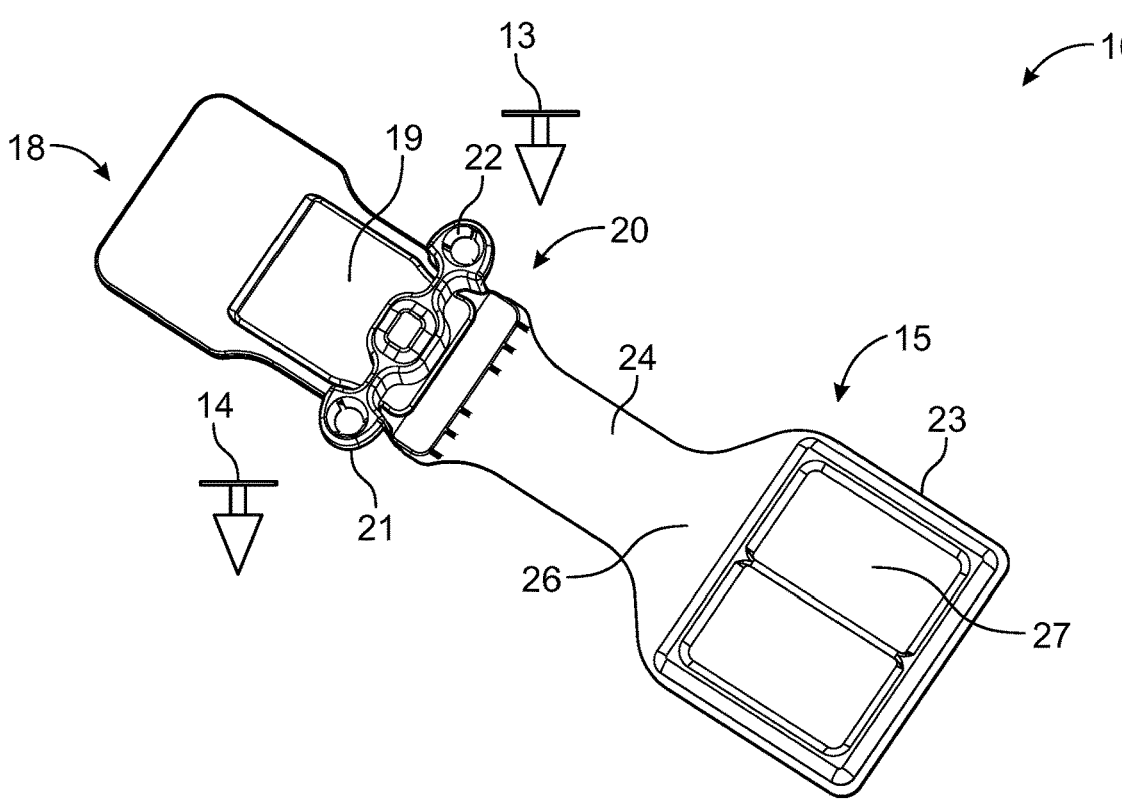
FIG. 3 is a front perspective view of the foldable ear tag.
Figure 4:
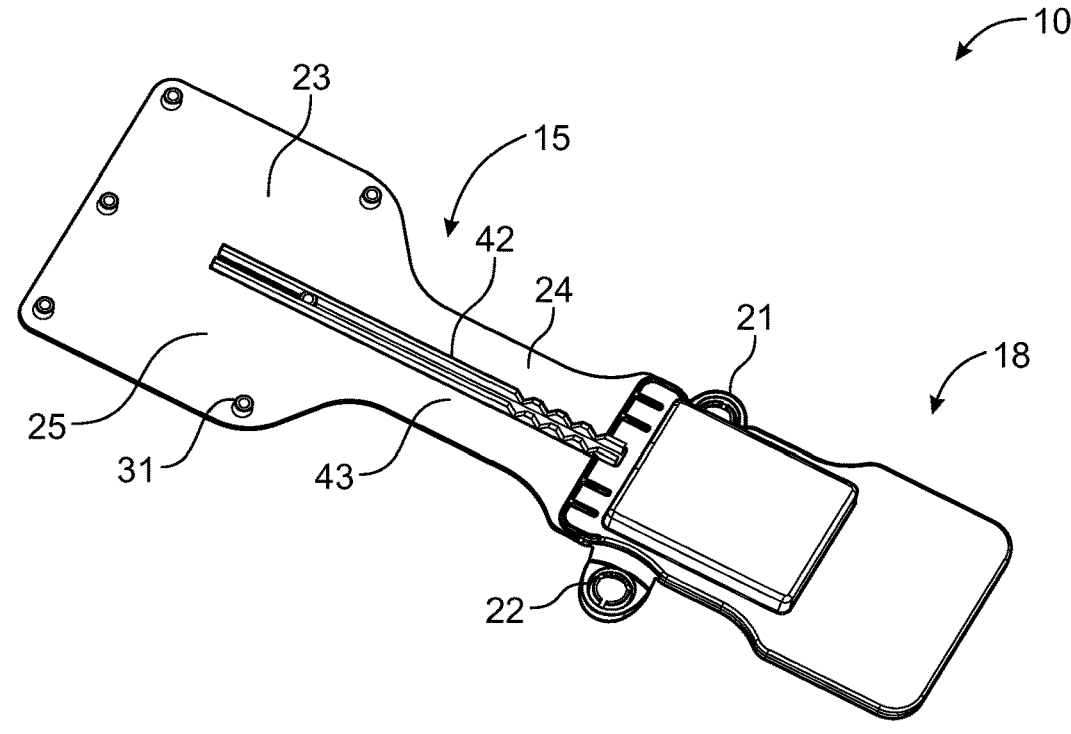
FIG. 4 is a rear perspective view of the foldable ear tag.

FIGS. 3 and 4, collectively, provide isometric views of the tag 10 which includes a flexible substrate 15 (first segment), a rigid housing 18 (second segment), an electronics assembly 19, a sensor housing 20, pin receivers 21 and 22 (also referred to as fastener apertures), and the two fasteners 13 and 14.

Figure 5:
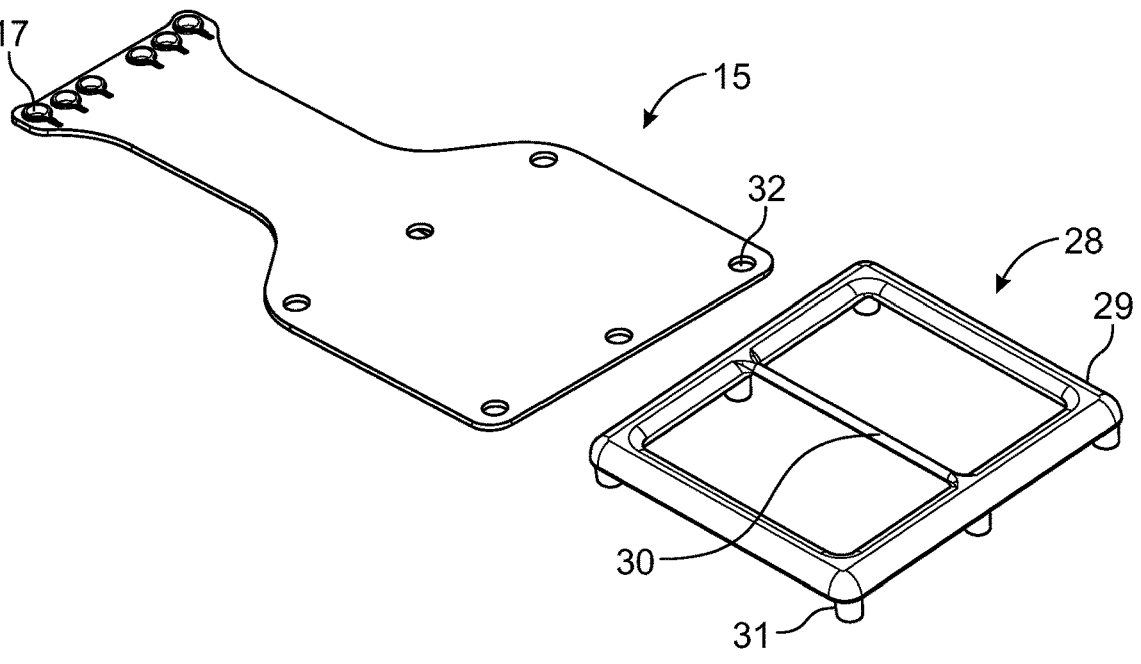
FIG. 5 is an exploded perspective of a first segment of the foldable ear tag.

In more detail, the flexible substrate 15 has a first end 23 and a second end 24, as well as a first surface 25 and a second surface 26. A photovoltaic element 27 (solar panel) is provided on the first end 23 and oriented on the second surface 26. FIG. 5 is an exploded perspective view of the first segment and flexible substrate 15 and a photovoltaic element frame 28. The flexible substrate 15 can include a photovoltaic element frame 28 that has body 29 and a midline strut 30 subdivides the photovoltaic element frame 28. The photovoltaic element 27 fits inside the photovoltaic element frame 28. The edges of the photovoltaic element 27 are covered by the body 29. The photovoltaic element frame 28 has tubular protrusions, such as tubular protrusion 31. These tubular protrusions are inserted into first end apertures, such as first end aperture 32 in the flexible substrate 15. The tubular protrusions are press-fit into the apertures of the flexible substrate 15 to secure the photovoltaic element frame 28 to the flexible substrate 15 such that the tubular protrusions extend through the flexible substrate 15 and past the first surface 25. In some embodiments, the first end 23 has a larger surface area than the second end 24. That is, the first end 23 tapers to the second end 24. The second end 24 flares to provide an enhanced mating interface with the rigid housing 35.

Figure 6:
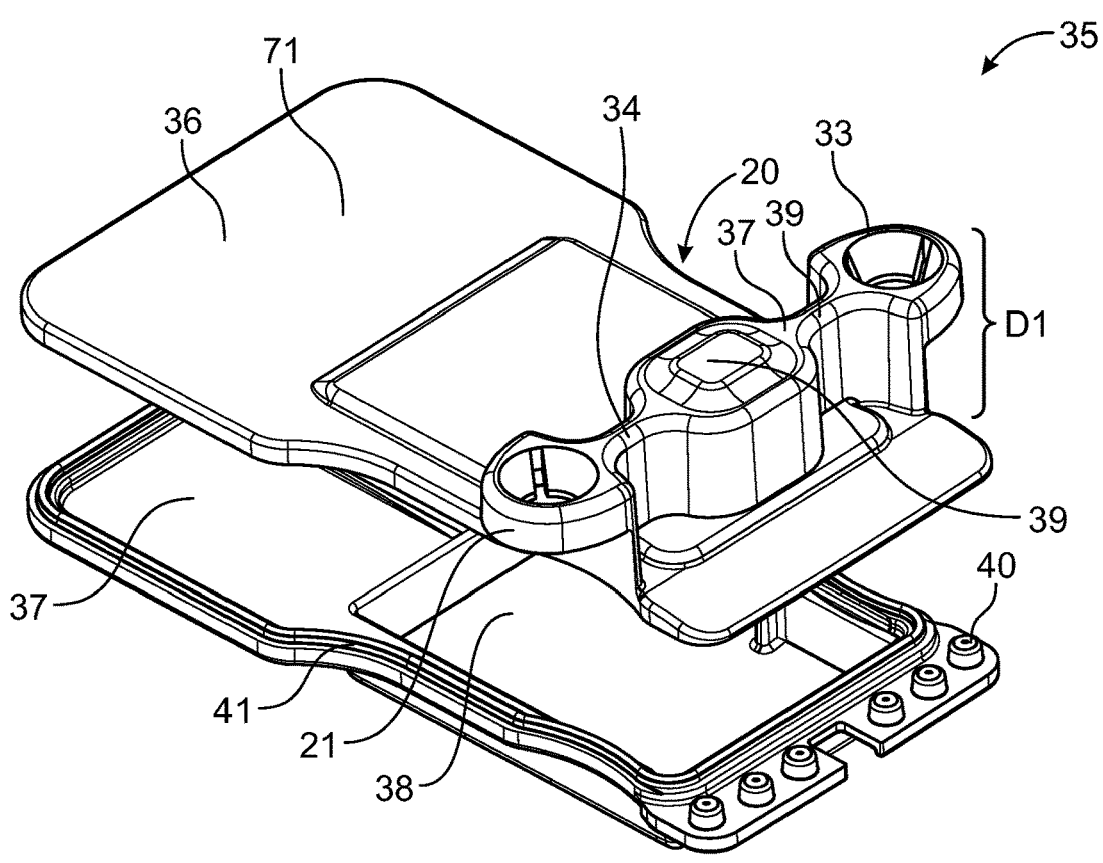
FIG. 6 is an exploded perspective of a second segment of the foldable ear tag.

The second end 24 of the flexible substrate 15 is provided with second end apertures, such as second end aperture 17 that extend through the second end 24 and engage with elements of the rigid housing 35 as will be discussed below. In FIG. 6, an exploded view of the rigid housing 35 (second segment) is illustrated. The rigid housing 35 includes an upper portion 36 (supportive backplate) and a lower portion 37. The lower portion includes a body having a cavity 38 that receives electrical components which will be discussed in greater detail below. The lower portion 37 also includes protrusions, such as protrusion 40 that engage with the proximal apertures of the flexible substrate 15. When the upper portion 36 is joined with the lower portion 37, the second end 24 of the first substrate 15 is captured therebetween, joining the flexible substrate 15 to the rigid housing 35. In some embodiments, the lower portion 37 includes a lip 41 that is configured to engage with a groove (not shown) in the upper portion 36 that functions to releasably secure the lower portion 37 to the upper portion 36 when the upper portion 36 is snapped together with the lower portion 37 (press fit).

In some instances, the body of the upper portion 36 includes an area 71 that is configured to receive reflective material or a visual indicator that includes, for example, a number that uniquely identifies the animal. Other types of indicia can be used, as would be known to one of ordinary skill in the art. To be sure, indicia can be provided on either side. Also, an LED (light emitting diode) or other luminance generating element can be included. The LED could be used to emit a pattern or luminate to help identify the location of the animal, which could be helpful in low-light conditions.

The sensor housing 20 is located on the upper portion 36 and extends at a distance D1 away from the upper portion 36. The sensor housing 20 has a body that houses a biometric sensor 39 that is intended for skin contact with an ear of the animal. Non-limiting examples of biometrics that can be sensed include strain, pressure, thermal, heart rate, electro-physiological, and sweat—just to name a few. The sensor housing 20 has wings 33 and 34 that extend outwardly in opposing directions. The wings terminate with the pin receivers 21 and 22, respectively. The pin receiver 21 receives fastener 13 and pin receiver 22 receives fastener 14 (see FIG. 3 and FIGS. 7 and 8). Again, the use of two pins and laterally extending wings/pin receivers reduces a likelihood that the tag will rotate when attached to the ear of the animal.

Figure 7:
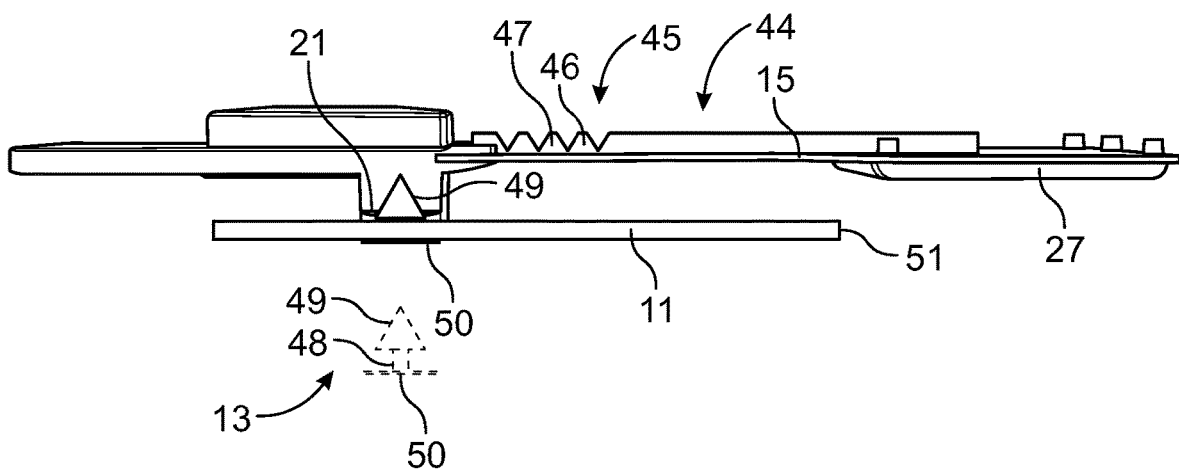
FIG. 7 is a side view of the foldable ear tag associated with the ear of an animal, where the foldable ear tag is extended.
Figure 8:
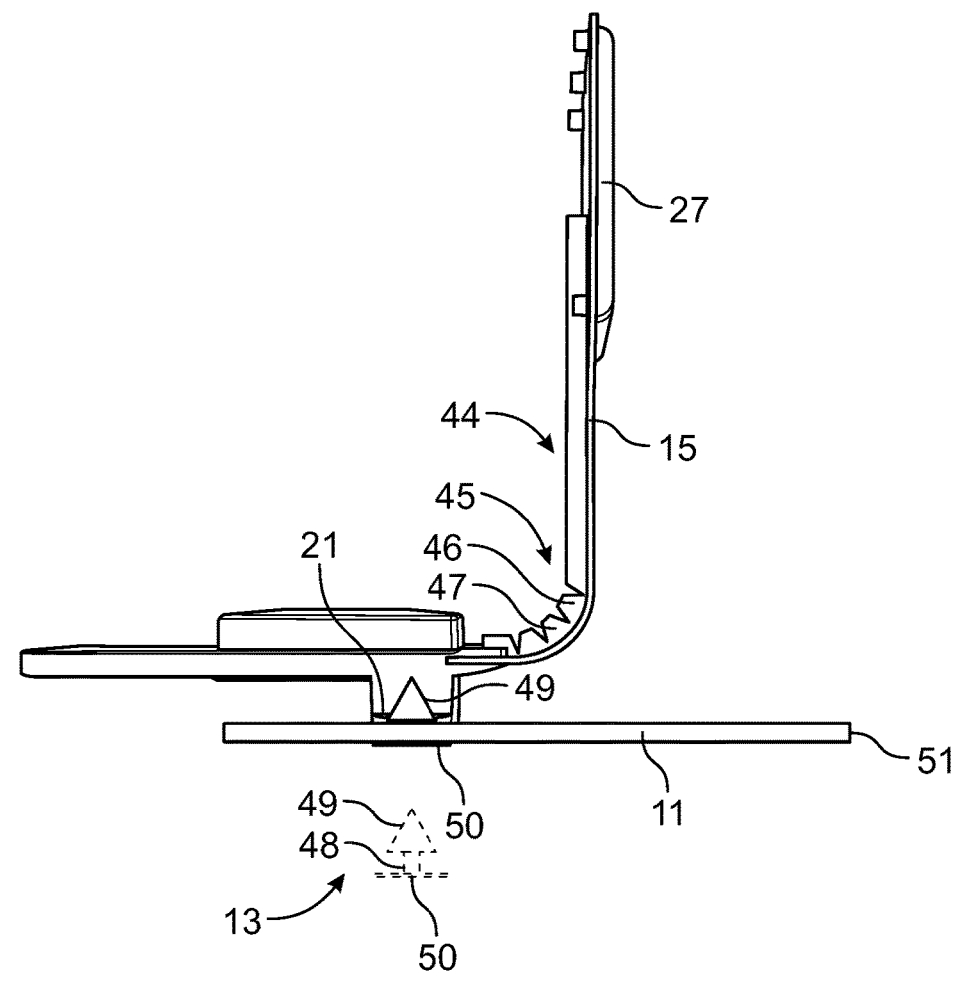
FIG. 8 is a side view of the foldable ear tag associated with the ear of an animal, where the foldable ear tag is curved.

Referring back to FIG. 4, the tag 10 includes support ribs 42 and 43 that extend longitudinally along the flexible substrate 15. The support ribs are also referred to as elongated reinforcement rails. As best illustrated in FIG. 7, each of the support ribs is bifurcated into a solid/continuous section 44 and a serrated section 45, the serrated section 45 facilitating predefined articulation of the flexible substrate 15. That is, the support ribs control the overall amount of curve of the flexible substrate 15. The sawtooth nature of the serrated sections controls the bend radius of the flexible substrate 15. That is, as an example, the serrated section 45 includes teeth 46 and 47 that are separated from one another and will abut one another when the flexible substrate 15 is curved to prevent overbending of the tag 10. The tag 10 is illustrated in this curved configuration in FIG. 8.

Additionally, in FIG. 7, the ear 11 of the animal is shown with the fastener 13 inserted into the pin receiver 21. The fastener 13 has a shaft 48, a tip 49, and a plate 50. The tip 49 is sized so that when it is inserted through the pin receiver 21, the tip 49 locks with the pin receiver 21. The ear 11 is captured between the plate 50 and the pin receiver 21. The photovoltaic element 27 extends past a periphery or edge 51 of the ear 11.

Figure 9:
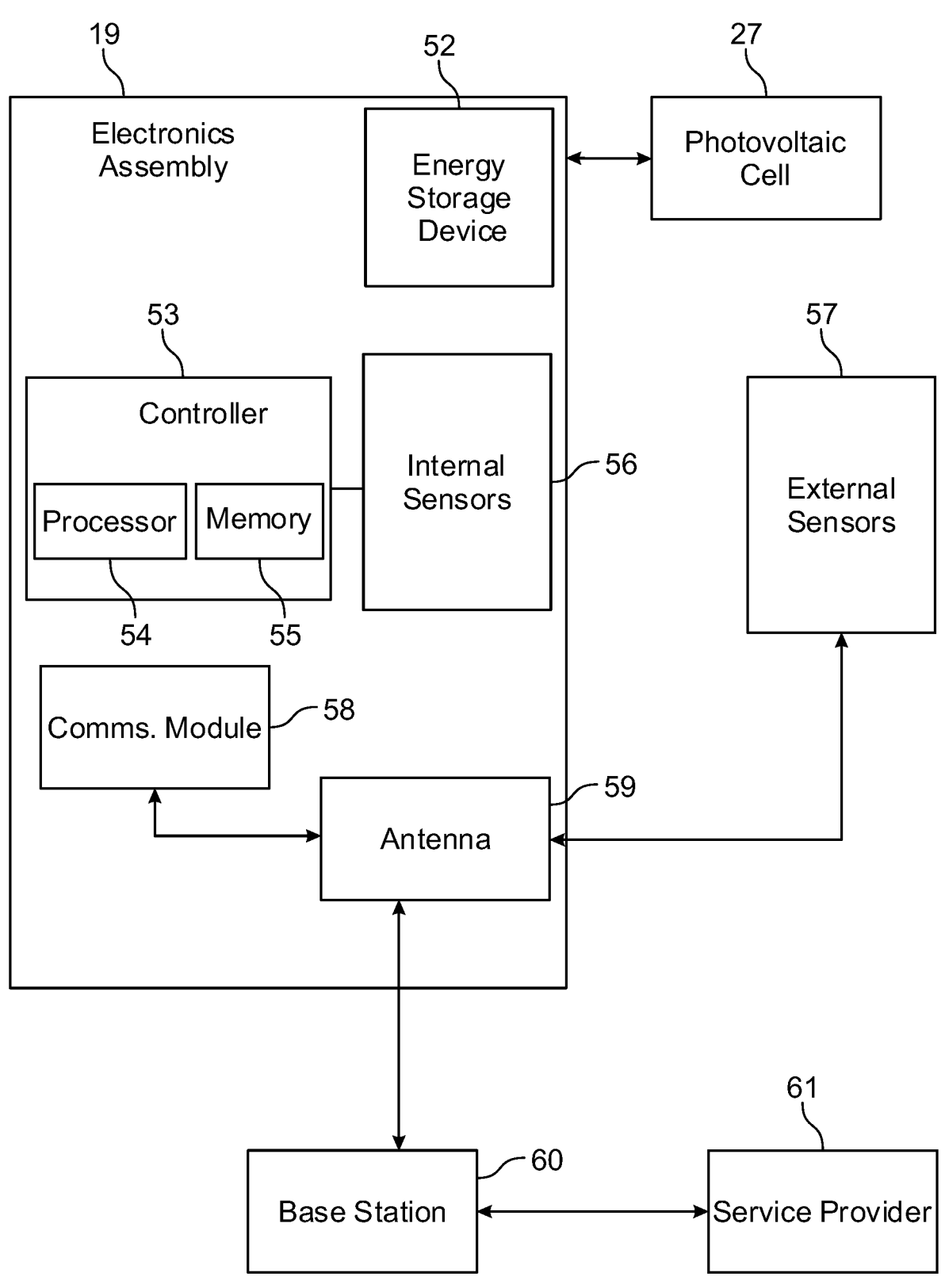
FIG. 9 is a schematic diagram of the foldable ear tag with optional external components.

FIG. 9 is a schematic view of the tag, including the electronics assembly 19 (comprising control circuitry), as well as other network elements used by the tag to offload data. The photovoltaic element 27 is electrically coupled to the electronics assembly 19 via an electronic trace or wire. The energy that is gathered by the photovoltaic cell is gathered and stored in an energy storage device 52 of the electronics assembly 19. The gathered energy can also directly power the electronics assembly 19.

The electronics assembly 19 can include a controller 53 having a processor 54 and memory 55 for storing instructions and data gathered by the controller 53. The processor 54 executes instructions stored in memory 55 to perform various actions and methods. One such method relates to obtaining biometric data from the internal sensors 56 or external sensors 57. The sensors can include any one or more of biometric sensors such as temperature, oxygen level, blood oximetry, blood pressure, respiration, and the like. One example of internal sensors or onboard sensors includes a heart rate monitor.

External sensors 57 can also include motion, acceleration, and/or position sensors that detect the movement, orientation, and location of the animal over time or at specific times. Some sensors are positioned on the animal's head (on the ear), the movement of the tag is indicative of both the movement of the animal's head as well as the movement of the animal in general. Some external sensors may not be located on the ear or head of the animal. External sensors 57 may be physically separate from the tag.

The electronics assembly 19 can include a communications module 58 that allows the tag or controller to transmit and/or receive data over a network, using any short- or long-range wireless protocol using an antenna 59. For example, the controller 53 can transmit sensor data collected from the sensors to a base station 60 located in a paddock or a confinement area using the antenna 59. The controller 53 can offload sensor data to the base station 60 when the controller 53 is in the communication range of the base station. The base station 60 can be configured to process the sensor data locally or forward the data to a service provider 61 for processing. As noted above, the tag can also connect directly to the service provider via cellular or satellite communication networks.

F. Operation of Preferred Embodiment

Figure 10:
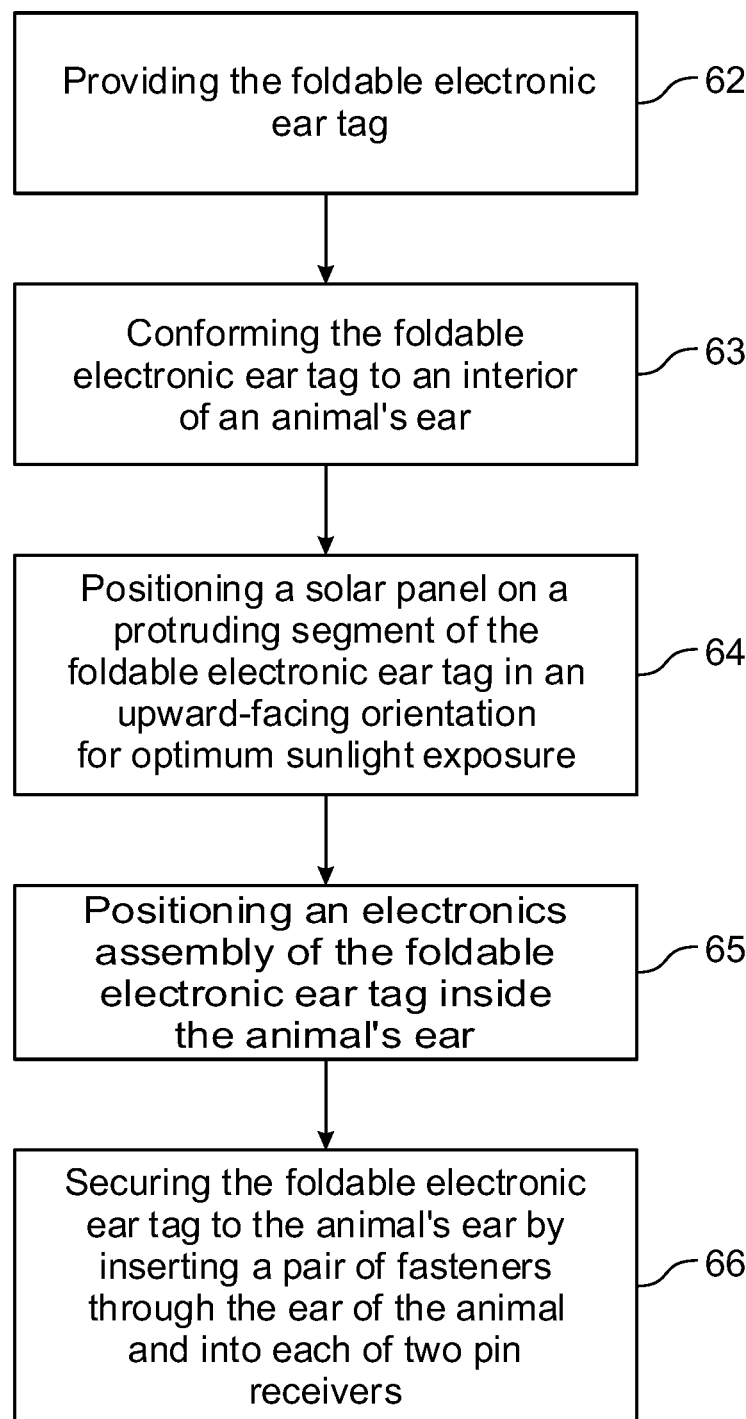
FIG. 10 is a flowchart of an embodiment of the present disclosure.

FIG. 10 is a flowchart of an example method of installation and use. The method includes a step 62 of providing the foldable electronic ear tag, as well as a step 63 of conforming the foldable electronic ear tag to an interior of an animal's ear. Once the tag is in place, the method includes a step 64 of positioning a solar panel on a protruding segment of the foldable electronic ear tag in an upward-facing orientation for optimum sunlight exposure. This can include ensuring that the solar panel extends beyond a periphery of the ear. The installation also includes the step 65 of positioning an electronics assembly of the foldable electronic ear tag inside the animal's ear. In some embodiments, the method includes a step 66 of securing the foldable electronic ear tag to the animal's ear by inserting a pair of fasteners through the ear of the animal and into each of two pin receivers. That is, each pin receiver is associated with one fastener. The use of two fasteners and pin receivers functions to reduce unwanted movement of the tag related to the ear of the animal.

Figure 11:
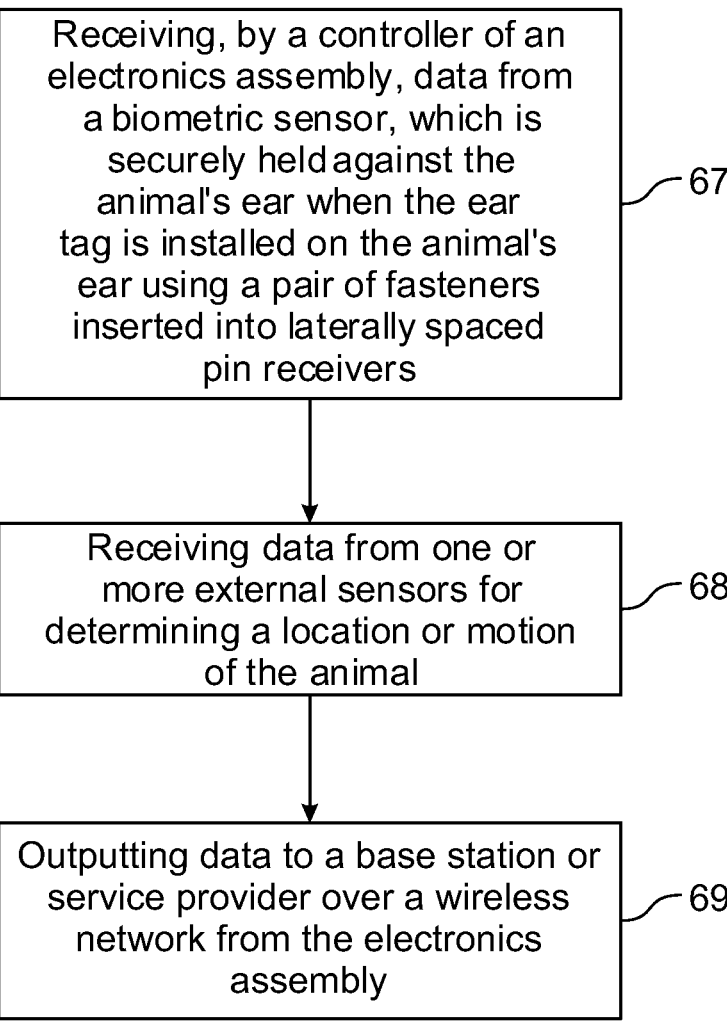
FIG. 11 is a flowchart of another embodiment of the present disclosure.

FIG. 11 is a method for using the foldable electronic ear tag after installation. The method includes a step 67 of receiving, by a controller of an electronics assembly, data from a biometric sensor, which is securely held against the animal's ear when the ear tag is installed on the animal's ear using a pair of fasteners inserted into laterally spaced pin receivers. The biometric sensor data can include at least one biometric parameter such as heart rate, temperature, oxygen level, blood oximetry, blood pressure, and/or respiration, as well as other biometric parameters that may infer or indicate a health level of the animal.

The method also optionally includes a step 68 of receiving data from one or more external sensors for determining a location or motion of the animal. The method can include a step 69 of outputting data to a base station or service provider over a wireless network from the electronics assembly. The electronics assembly, and specifically the controller, outputs the data when the electronics assembly is in wireless communications range to the base station. In some instances, these communications can be direct.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the present disclosure will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the embodiments in the present disclosure, suitable methods and materials are described above. Thus, the present disclosure is not intended to be limited to the embodiments shown, but is to be accorded the widest scope consistent with the principles and features disclosed herein.

Unless otherwise defined, all technical and scientific terms used herein have the same meaning as commonly understood by one of ordinary skill in the art to which this invention belongs. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. Any headings utilized within the description are for convenience only and have no legal or limiting effect.

What is claimed is:

1. A device, comprising:
a flexible substrate having a first end and a second end;
a solar panel coupled to the first end on a first surface;
a rigid housing associated with the second end;
an electronics assembly associated with the rigid housing;
a sensor housing that extends from the rigid housing, the sensor housing comprising two pin receivers that extend in opposing directions relative to one another, the two pin receivers each adapted to receive a pin that secures the device to an ear of an animal; and
a stiffening spine that extends perpendicularly from the flexible substrate and that extends along a midline of the device.

2. The device according to claim 1, further comprising an antenna coupled to the electronics assembly.

3. The device according to claim 2, wherein the antenna is located in housing of the electronics assembly.

4. The device according to claim 1, further comprising a skin contact sensor associated with the sensor housing.

5. The device according to claim 1, wherein the stiffening spine includes a continuous portion and a sawtooth portion, wherein the sawtooth portion enables controlled bending of the flexible substrate.

6. The device according to claim 5, further comprising another stiffening spine constructed identically to the stiffening spine and placed in parallel relationship thereto.

7. The device according to claim 1, wherein the two pin receivers are spaced apart from the rigid housing at a distance.

8. An electronic tag, comprising:

a first segment with a photovoltaic element affixed on a primary side thereof;

a second segment, opposite the first segment, integrating a supportive backplate;

an electronics assembly mounted on the supportive backplate, comprising control circuitry;

a coupling feature extending from the supportive backplate having dual engagement cavities oriented in opposite vectors, each configured to accommodate a securing element for affixation to an ear of an animal; and an elongated reinforcement rail that traverses orthogonally across the first and second segments and that is situated centrally along a longitudinal axis of the electronic tag.

9. The electronic tag of claim 8, further including an antenna operatively connected to the electronics assembly.

10. The electronic tag of claim 9, wherein the antenna is a multi-directional signal transmitter.

11. The electronic tag of claim 8, further comprising an external sensor, the electronics assembly communicatively coupled to the external sensor over a wireless connection.

12. The electronic tag of claim 8, wherein the elongated reinforcement rail is bifurcated into a solid section and an adjustable serrated section, a latter facilitating predefined articulation of the first segment.

13. The electronic tag of claim 12, wherein the elongated reinforcement rail is duplicated and arranged in a parallel configuration for reinforced structural integrity.

14. The electronic tag of claim 8, further comprising a heart rate sensor.

15. The electronic tag of claim 8, wherein the electronics assembly further integrates a storage cell electrically coupled to the photovoltaic element for energy accumulation and dispensation.

16. The electronic tag of claim 8, wherein the photovoltaic element is configured to extend past a periphery of the ear with the tag is installed.

17. The electronic tag of claim 8, wherein the second segment includes a portion that receives indicia for identifying the animal.

18. The electronic tag of claim 8, wherein the first segment is a flexible substrate.

\* \* \* \* \*